United States Patent [19]
Fenton et al.

[11] Patent Number: 6,161,012
[45] Date of Patent: Dec. 12, 2000

[54] SHORT CODE DIALLING

[75] Inventors: Christopher John Fenton; Alan James Clapton, both of Ipswich, United Kingdom

[73] Assignee: British Telecommunications public limited company, London, United Kingdom

[21] Appl. No.: 09/051,139
[22] PCT Filed: Mar. 26, 1997
[86] PCT No.: PCT/GB97/00865
§ 371 Date: Mar. 31, 1998
§ 102(e) Date: Mar. 31, 1998
[87] PCT Pub. No.: WO97/37502
PCT Pub. Date: Oct. 9, 1997

Related U.S. Application Data

[63] Continuation-in-part of application No. 08/709,692, Sep. 10, 1996, abandoned.

[30] Foreign Application Priority Data

Mar. 29, 1996 [GB] United Kingdom ............... 9606748

[51] Int. Cl.$^7$ .................................... H04Q 7/38
[52] U.S. Cl. .................. 455/432; 455/564; 455/565
[58] Field of Search ................ 455/564, 565, 455/550, 558, 414, 445, 432, 554, 433; 379/40, 51, 207, 220, 233, 234

[56] References Cited

U.S. PATENT DOCUMENTS

| | | | |
|---|---|---|---|
| 5,337,342 | 8/1994 | Kruger et al. | 379/40 |
| 5,347,632 | 9/1994 | Filepp et al. | 395/200 |
| 5,418,837 | 5/1995 | Johansson et al. | 455/558 |
| 5,418,844 | 5/1995 | Morrisey et al. | 379/207 |
| 5,481,603 | 1/1996 | Gutierrez et al. | . |
| 5,537,474 | 7/1996 | Brown et al. | 380/23 |
| 5,784,450 | 7/1998 | Stahl | 379/233 |
| 5,835,583 | 11/1998 | Hetz et al. | 379/220 |
| 5,909,485 | 6/1999 | Martin et al. | 379/144 |

FOREIGN PATENT DOCUMENTS

| | | |
|---|---|---|
| 491 493 | 6/1992 | European Pat. Off. . |
| 0616455 A2 | 9/1994 | European Pat. Off. . |
| WO 94/05126 | 3/1994 | WIPO . |
| 95 06381 | 3/1995 | WIPO . |
| 95 20299 | 7/1995 | WIPO . |
| WO 96/03823 | 2/1996 | WIPO . |

OTHER PUBLICATIONS

Scheifler et al, "The X Window System", ACM Transaction on Graphics, vol. 5, No. 2, Apr. 1996, New York, US, pp. 79–109.

M. Mouly et al, "The GSM System for Mobile Communications", 1993, Mouly, Pautet, Lassay–Les Chateaux, FR, pp. 67, 71, 142 and 148.

Primary Examiner—Edward F. Urban
Assistant Examiner—Longvan Tran
Attorney, Agent, or Firm—Nixon & Vanderhye P.C.

[57] ABSTRACT

A mobile telephone network stores a list of short dialling codes in association with each user's identity so as to define the short codes which each individual user is permitted to use for providing access to a data conversion device which gives access to a private network. When a short code is dialled on a mobile station, calling data comprising the short code together with caller identification data derived from the mobile station are transmitted over the radio link to the mobile switching center. Prior to routing the call, the identity of the dialling station is authenticated. The short code in the calling data is then compared with the permitted list of short codes to determine whether the user is permitted to make the call. If the caller is permitted to make the call, the call is routed to a destination corresponding to the data conversion device. Thus, only permitted users may access the data conversion device. Furthermore, it is possible for a network operator to configure thee data conversion device such that an operator can offer a subscriber a fixed relationship between a code and a data conversion device. The device can then be configured with subscriber-specific information so as to make onward communications easier and more professional, for example, through personalized welcome pages, simplified access to user-specific data, etc.

36 Claims, 2 Drawing Sheets

SHORT CODE DIALLING

RELATED APPLICATIONS

This is a continuation-in-part of our earlier commonly assigned application Ser. No. 08/709,692, filed Sep. 10, 1996, now abandoned.

BACKGROUND OF THE INVENTION

1. Field of the Invention

This invention relates to a short code subscription apparatus for a telecommunications network, and to a method of making calls through the network using short codes.

2. Related Art

In conventional telecommunication networks, calls are usually connected on the basis of a diallable number which forms part of a defined numbering plan. Conventional telephone numbers typically comprise a large number of digits, typically nine or more, although in certain circumstances they may comprise as few as five or six digits for local calls on the fixed PSTN (public switched telephone network). Alternatively, short codes of for example two or three digits can be used in private networks. These short codes can be used with a look-up memory in order to access a full telephone number on the basis of a short code. The term "short code" is used in this specification to mean a code which is shorter than the normal telephone number of the line accessed by the code. Because such codes are short they are easy to find fortuitously, making access control difficult.

It is possible to configure a service that allows a mobile user to access a data converting device, commonly known as a Packet Assembler/Diassembler (PAD), so that communications with database hosts and other users on a Packet Switched Public Data Network (PSPDN) can be made. Existing systems within the GSM (Global System for Mobile communication) standard can be used to identify short codes of the kind described above to allow access to a PAD, but there is no management of authorisation of access to a specific PAD by the GSM network so, in order to provide security, the user of the mobile station needs to enter a specific password and comply with other security measures in order to gain access into the private network after the initial connection has been established to the private network by the use of the short code, thereby preventing accidental or deliberate use of the short code to gain unauthorised access. These additional security measures need to be performed after the call has been connected, and so if the user is not permitted access, network resources have been wastefully used up during the failed connection process. Furthermore, the use of passwords is inconvenient for the mobile user, and defeats the advantages of short code access.

Services such as call screening can be used to provide a measure of security for the dialled station, by determining the number of the dialling station. This service is provided for the security of the dialled station, so the recipient of the call may be required to pay for this benefit. Also, since the screening takes place at the dialled station, network resources are used to make the initial connection, which is wasteful if the call is to be rejected.

SUMMARY OF THE INVENTION

The present invention provides an alternative approach. In accordance with the invention, there is provided a short code dialling apparatus comprising: telecommunication network means for selectively providing communication links between a plurality of dialling stations and a plurality of dialled stations in dependence upon short codes produced by the dialling stations, at least one dialled station being selectable by a predetermined short code; and checking means for comparing the identity of a short code produced by a dialling station with the identity of the dialling station and, if the short code corresponds to a short code permitted to be used for calls made from said station, allowing the communication link to be established, wherein the dialled station is a data conversion device configured such that operations are performed, the operations being dependent on the short code dialled and and the dialling station identity.

Thus, in accordance with the invention, the short code generated at the dialling station is checked before the communication link between the dialling station and the dialled station is established, avoiding wasteful use of network resources in the event that the call is not permitted to be made from the dialling station, for example because the user of the dialling station is not an authorised subscriber of the data conversion device. Furthermore, it is possible for a network operator to configure the data conversion device (PAD) such that for a given short code a single PAD (or group of PADs) will have an association. This allows an operator to offer a subscriber a fixed relationship between a short code and a PAD. The PAD can then be configured with subscriber-specific information so as to make onward communications easier and more professional.

The invention has particular application to mobile networks, especially cellular networks. In a conventional mobile network, the identity of the user of a mobile station, such as a mobile telephone handset, is determined by comparing a unique identification code held in the mobile station with a stored value held in the network and, in the case of GSM, additional authentication processes are performed to provide additional security. In accordance with the invention, this system may be adapted to permit the network to determine whether particular short codes are permitted to be dialled from the mobile station, and how to configure the data conversion device for the individual user.

To this end, the mobile network may include a service control means that stores data concerning the identity of mobile stations for use with the network and corresponding groups of short codes permitted to be used from the respective mobile stations. The mobile network may include message switching means operative in response to such a short code, and to calling data received from a mobile station concerning the identity thereof, to refer the calling data to the service control means for determining whether the short code is permitted to be used by the mobile station, and routing the call according to the short code if the short code is permitted for use, but otherwise failing a call.

The short code may be used to access a network such as a private packet switch network. Since the checking means itself provides a check as to whether the short code is permitted for use from the mobile station, there may be no need to provide further password security for accessing the packet switch network, because the identification of the mobile subscriber is itself sufficient to determine whether it is permitted to make calls to the network from the mobile station.

The apparatus can also be used when mobile stations "roam" from one network to another; that is, a mobile station operates in co-operation with a network other than its "home" network. When the roaming mobile station is registered with the network, the short codes permitted for use by the mobile station can be loaded into a visitor register means that keeps a record of data concerning the roaming mobile station and the short codes permitted to be used by the roaming station.

The invention also includes a method of selectively establishing telecommunication links between a plurality of dialling stations and a plurality of dialled stations in dependence upon short codes produced by the dialling stations, at least one dialled station being selectable by a predetermined short code, the method comprising the steps of: comparing a short code produced by a dialling station with the identity of the dialling station; if the short code corresponds to a short code permitted to be used for calls made from said dialling station, allowing a communication link to be established; and performing subscriber-specific data-conversion operations at the dialled station, the operations being dependent on the short code produced by the dialling station and on the identity of the dialling station.

BRIEF DESCRIPTION OF THE DRAWINGS

In order that the invention may be more fully understood an embodiment thereof will now be described by way of example with reference to the accompanying drawings in which.

DETAILED DESCRIPTION OF EXEMPLARY EMBODIMENTS

Figure 1:
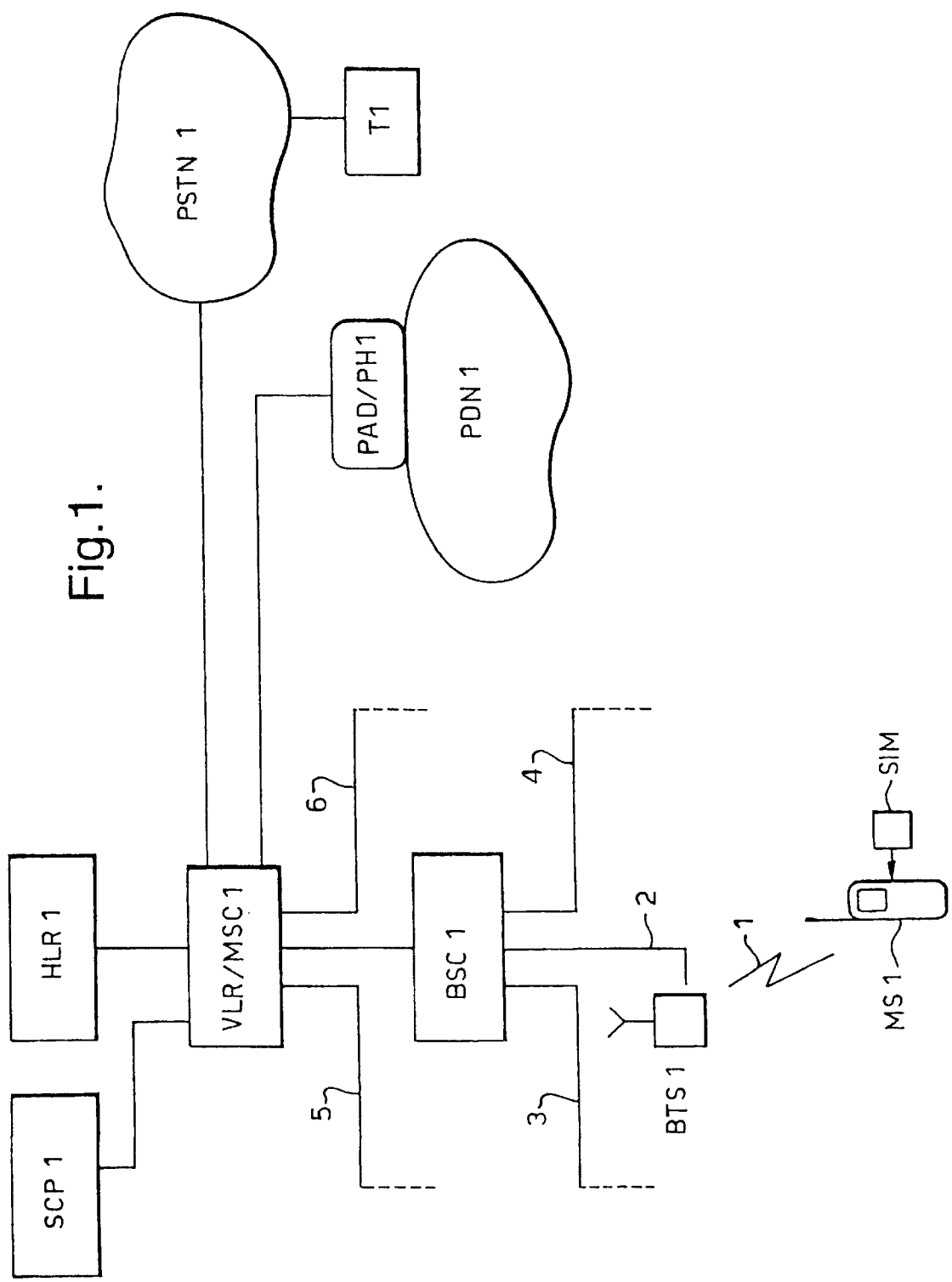
FIG. 1 is a schematic block diagram of a mobile network that incorporates short code subscription apparatus in accordance with the invention.

Referring to FIG. 1, a mobile cellular telephone network operating in accordance with the GSM standard is shown schematically. A mobile station MS1, in a conventional manner, includes a subscriber identification module SIM, which consists of a "smart card" inserted into the mobile station. A radio communication link 1 is established between the mobile station and a base transceiver site BTS1. This base transceiver site is one of a number of base transceiver sites BTS spaced apart at locations within an area of coverage of the network which operate at different frequencies to provide individual cells in a manner well known per se. Groups of base transceiver sites are connected to a base station controller BSC1. The connection for the base transceiver site BTS1 is referenced 2 in FIG. 1 and references 3 and 4 illustrate schematically the connections of other base transceiver sites to the base site controller BSC1. The base site controller BSC1 is connected to a mobile switching centre MSC1. Other base site controllers (not shown) in the network are also connected to the mobile switching centre MSC1, as shown schematically by signal paths 5, 6. In FIG. 1, the mobile switching centre MSC1 is connected to a conventional land-based public switched telephone network PSTN1 and includes a gateway for incoming calls from the PSTN. Also, the mobile switching centre MSC1 is connected to a private packet switched digital network PDN1. Access to the private network PDN1 is provided through a packet assembler/disassembler or a packet handler PAD/PH1. For example, the private network PDN1 may comprise a private company network providing data communication between different factories or offices within the company. A conventional telephone handset T1 is shown connected to PSTN1.

In use, calls made from the mobile station MS1 are routed through the base site controller BSC1 to the mobile switching centre MSC1 where they are routed either to other mobile stations within the GSM network or to dialled stations in other networks e.g. the telephone T1 connected to PSTN1. Calls can be made to the mobile station MS1 in an inverse manner. For further details of the configuration of the GSM mobile network, reference is directed to the various GSM standards papers issued by the European Telecommunications Standards Institute (ETSI).

The mobile GSM network also includes a home location register HLR1. Furthermore, a visitor location register VLR1 is coupled to the mobile switching centre MSC1. The home location register HLR1 contains information concerning a unique identification number known as an International Mobile Subscriber Identity (IMSI) for each SIM registered as having its home location with the network, together with a GSM secret key, which is a security code unique to the user. In the GSM protocol, when a telephone call is made from the mobile station MS1, data concerning the IMSI held on the SIM card is transmitted to the mobile switching centre MSC1, together with an encrypted version of the secret key and the dialled digits designating the station to be dialled e.g. the telephone T1. The the mobile switching centre MSC1, on receipt of such data, validates the user according to standard GSM procedures, which involve checking the encrypted version of the secret key with a corresponding version produced locally with reference data from the home location register HLR1.

Typically, when dialling a dialled station such as telephone T1, the dialled number is a relatively long dialled code e.g. nine digits or more. However, the GSM standard also contemplates the use of short codes for accessing packet switched networks such as the private network PDN1. The mobile switching centre MSC1 is configured to recognise a short code such as a two digit code to provide the mobile user with access to the network. However, conventionally, there has been no security associated directly with the two digit code. Instead, security has been provided by the use of a password regime. The user is obliged to enter a password in the form of a multi-digit code after connection to the PAD/PH1 has been established.

The present invention provides an alternative approach. In accordance with the invention, the home location register HLR1 stores a list of the short codes in association with each user's IMSI so as to define the short codes which each individual user is permitted to use.

When a short code is dialled on the mobile station MS1, calling data comprising the short code together with caller identification data derived from the SIM card are transmitted over the radio link 1 to the base transceiver site BTS1 and thence to the mobile switching centre MSC1 through the base site controller BSC1. Prior to routing the call, the mobile switching centre MSC1 refers the calling data to the visitor location register VLR1 where the identity of the dialling station MS1 is authenticated by use of the IMSI and the secret key. The short code in the calling data is then compared with the permitted list of short codes to determine whether the user is permitted to make the call. If the caller is permitted to make the call, the visitor location register VLR1 signals to the mobile switching centre MSC1 that the call can be routed to a destination corresponding to the short code; in this instance PAD/PH1. Otherwise, the mobile switching centre MSC1 fails the call and an appropriate failure message is transmitted back through the base site controller BSC1 and the base transceiver site BTS1 to the mobile station MS1 to inform the user that the call has not been connected.

As is well known in the art, the security checking procedures used in the GSM standard, which make use of the IMSI held on the SIM card and the associated secret key process, provide a very high degree of security. Thus, access to PAD/PH1 can only be achieved through users which have been preassigned the short code which provides access. Thus, only permitted users may access the private network PDN1. Accordingly, the security checking procedures of the GSM standard have been adapted, according to the invention, to provide a secure access control to the private network and consequently, additional password measures are not needed to provide security.

It is possible for a network operator to configure the PAD such that for a given short code a single PAD (or group of PADs) will have an association. The allows an operator to offer a subscriber (e.g. a corporate) a fixed relationship between a short code and a PAD. The PAD can then be configured with subscriber-specific information so as to make onward communications easier and more professional. Such configurations are; formatted welcome page in corporate logo; list of short-cut preselected options to route caller to corporate hosts; or simply additional Closed User Group (CUG) information and autorouting the caller to the host (i.e. without having to navigate intermediate levels), once the user, and therefore his access privileges have been established. By providing the need to subscribe to the short code, the security of the PAD access can be assured.

This enhances the service to the subscriber by adding value to the call setup procedure through a personalised welcome page, access to user-specific data, etc, and by simplifying the charging since the user can receive the PSPDN (Packetc Switched Public Data Network) charges through the GSM network account.

Figure 2:
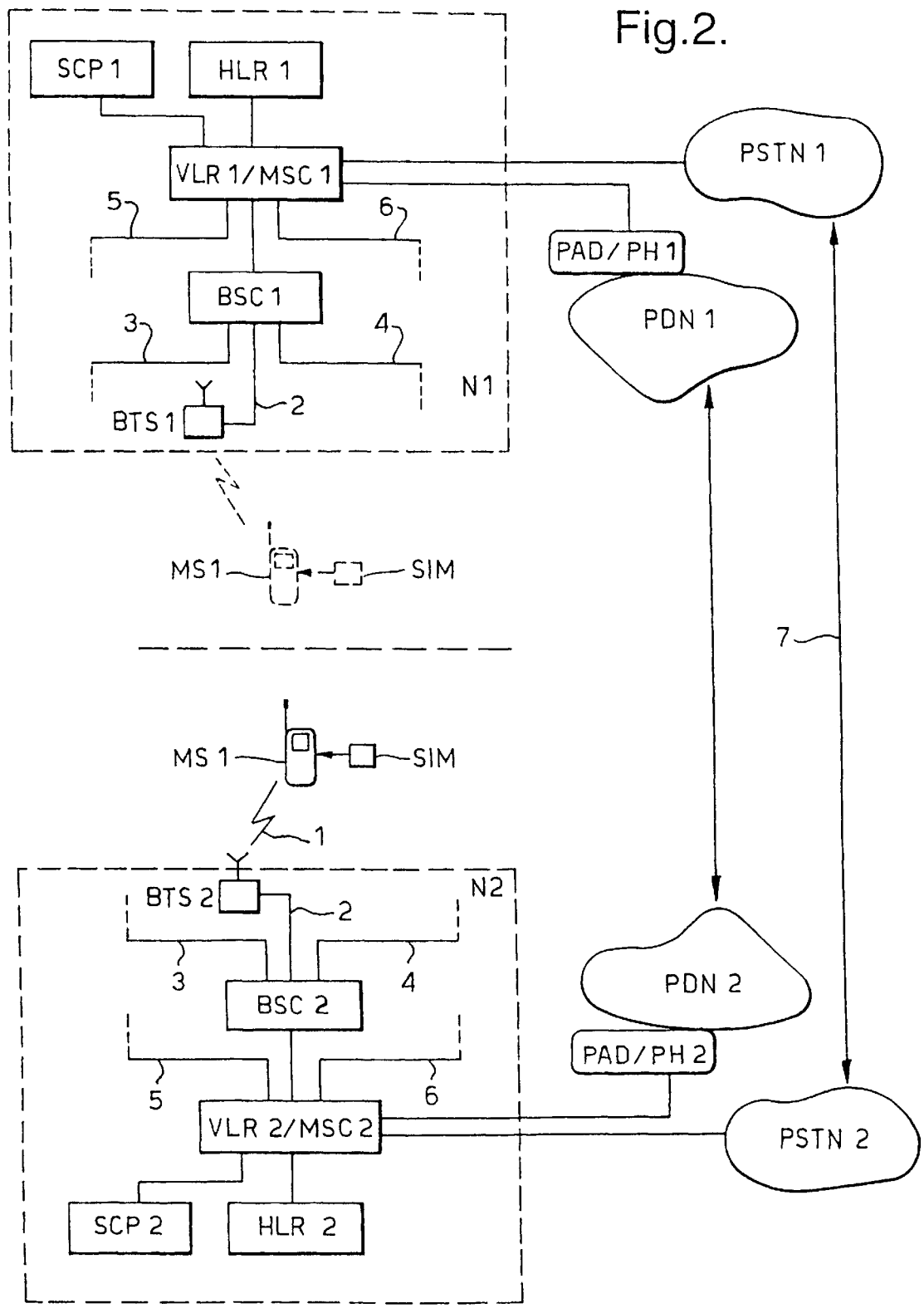
FIG. 2 illustrates two mobile networks for explaining how data concerning the short codes is processed in the event of the mobile station roaming.

The network will also provide similar facilities for roaming mobile stations, as will now be described with reference to FIG. 2. In FIG. 2, first and second mobile GSM networks N1 and N2 are shown. The network N1 corresponds to the configuration shown in FIG. 1 and the network N2 is substantially identical to N1, with its component parts being referenced with a suffix 2. Typically, the first network N1 may be in one country and the network N2 in a different country. The networks N1 and N2 are connected to respective local national public switched telephone networks PSTN1, 2. The national networks PSTN1, 2 are connected by international signal paths 7 in a manner well known per se. The private digital network PDN1 is connected to the private network PDN2 and may in fact form a single network for example for an international company with offices and factories in the two countries, the parts being linked by private telecommunications links. According to the GSM standard, the private networks PDN1 and PDN2 can both be accessed by the same short code.

When the mobile station MS1 roams from its home network N1 to the network N2, the mobile station needs to be registered with the network N2. In accordance with the GSM standard, a mobile station transmits its unique identification number derived from the SIM card to the network N2. The identification number is transmitted through the Base Transceiver. Site BTS2 and the Base Site Controller BSC2 to the mobile switching centre MSC2, where it is loaded into a visitor location register VLR2. The visitor location register VLR2 then instructs the network to establish a connectionless signalling path through PSTN2, PSTN1, and the international signalling system 7 to obtain information concerning the user from the home location register for the user namely HLR1. The relevant data is transmitted back to the network N2 and loaded into the visitor location register VLR2. Furthermore, in accordance with the invention, the relevant data includes the group of short codes permitted to be used by the user of the mobile station MS1. Thus, when the user of the mobile station MS1 makes a call through network N2 using a short code, the mobile switching centre MSC2, prior to routing the call, refers the calling data received from the mobile station to the visitor location register VLR2 where the identification data and the short code are compared with corresponding data derived from HLR2. If it is determined that the user is permitted to dial the short code, the call is appropriately routed by the mobile switching centre MSC2 but otherwise, the call is failed and a message is transmitted to the mobile station in the manner previously described with reference to FIG. 1. Thus, the same short code that was used to access the private network PDN1 in relation to network N1 can also be used when the mobile station has roamed to network N2 in order to access the private digital network through PAD/PH2, thus permitting a local connection to be made and minimising billing costs to the user.

Many modifications and variations of the described apparatus are possible. For example, in order to provide an enhanced service provision, the networks N1 and N2 may each include a service control point SCP1, SCP2, in which case the short code checking may be carried out at a service control point SCP1, SCP2 rather than using the data in the visitor location registers VLR1, VLR2.

Also, instead of each private network having a common short code for all users, each user may have his own set of short codes, which are individually interpreted by the network (HLR/VLR/MSC) to provide access to predetermined dialled stations, such as a private network, or dialled stations accessible by longer dialled codes in which case the Mobile Switching Centre (MSC) appropriately produces the longer dialled code.

The invention is applicable to other mobile networks and could for example be used with networks which are not cellular, such as a DECT network. Also, for cellular systems, it is not essential to use the GSM standard. For example, DAMPS or other known standards both digital and analogue could be used.

Furthermore, the invention is not restricted to mobile systems and can be used with conventional land-based switched telephone networks. For example, it is possible to offer a similar solution when access is required to a Intelligent Network (IN) Specialised Resource Function (SRF) which could provide the PAD functionality.

What is claimed is:
1. A short code dialling apparatus comprising:
   telecommunication network means for selectively providing communication links between a plurality of dialling stations and a plurality of dialled stations in dependence upon short codes produced by the dialling stations,
   at least one dialled station being a data conversion device selectable by a predetermined short code and having means for performing subscriber-specific data-conversion operations in response to the short code produced by the dialling station and/or the identity of the dialling station; and
   checking means for comparing the identity of a short code produced by a dialling station with the identity of the dialling station and, if the short code corresponds to a short code permitted to be used for calls made from said station, allowing the communication link to be established to the dialled station,
   the checking means being operative to disable routing of the call in the event that an associated short code is not permitted to be used by the dialing station.

2. Apparatus as in claim 1 wherein the checking means comprises:
    means for providing a group of short dialling codes permitted to be used by the dialling station, and
    means for comparing the short codes dialled from said station with the short codes in the group.

3. Apparatus as in claim 2 further including:
    means for associating data corresponding to the identity of the dialling station with the group, and
    means for comparing the identity of the dialling station with said data, to determine the permissible short codes that can be used by the dialling station.

4. Apparatus as in claim 2 further including:
    means defining a plurality of groups of short codes permitted to be used for calls made from a plurality of individual dialling stations.

5. Apparatus as in claim 1 further including:
    call routing means for selectively routing calls corresponding to the short codes dialled by the dialling station to the dialled stations.

6. Apparatus as in claim 1 wherein the network means includes:
    a first network for communicating with the dialling station, and
    a second network accessible from the first network by a predetermined one of said short codes.

7. Apparatus as in claim 6 wherein the first network includes a radio link for use with a mobile station as the dialling station.

8. Apparatus as in claim 7, including the mobile station for use as the dialling station.

9. Apparatus as in claim 8 wherein:
    the first network is a cellular radio network, and
    the mobile station includes a memory with a unique stored identification code to provide said identity.

10. Apparatus as in claim 9 wherein the unique code is stored in a SIM card.

11. Apparatus as in claim 7 wherein:
    the first network includes service control means that stores data concerning the identity of mobile stations for use with the network and corresponding groups of short codes permitted to be used from the respective mobile stations.

12. Apparatus as in claim 11 further including:
    message switching means operative, in response to calling data received from a mobile station concerning the identity thereof and a short code, to refer the calling data to the service control means for determining whether the short code is permitted to be used by the mobile station, and routing the call according to the short code if the short code is permitted for use, but otherwise failing the call.

13. Apparatus as in claim 12 further including:
    means for signalling to the mobile station that a call has failed when the short code in said calling data is determined to be impermissible for use by the mobile station.

14. Apparatus as in claim 11, wherein:
    the first network includes home register means for keeping data concerning the identity of the mobile stations registered for use with the network and the short codes permitted for use by the mobile stations respectively.

15. Apparatus as in claim 14, wherein:
    the home register means includes a register of dialled station numbers to be associated with the permitted short codes.

16. Apparatus as in claim 14 further including:
    visitor register means for keeping data concerning a mobile station that is roaming from another network and registered for use with the first network, the visitor register means including data concerning the short codes permitted to be used by the roaming mobile station.

17. Apparatus as in claim 16 wherein:
    the first network is operative to derive data concerning the permissible short codes for the roaming mobile station from the network from which it has roamed, in response to the roaming station registering with the first network.

18. Apparatus as in claim 6 wherein the second network comprises a packet switched network.

19. Apparatus as in claim 18 further including:
    packet assembling and disassembling means responsive to a predetermined one of the short codes for providing access to the second network from the first network.

20. Apparatus as in claim 6 wherein the second network is a private network.

21. Apparatus as in claim 1 wherein the short codes are two digit codes.

22. A method of selectively establishing telecommunication links between a plurality of dailling stations and a plurality of dialled stations in dependence upon short codes produced by the dialling stations, at least one dialled station being selectable by a predetermined short code, the method comprising:
    comparing a short code produced by a dialling station with the identity of the dialling station;
    if the short code corresponds to a short code permitted to be used for calls made from said dialling station, allowing a communication link to be established and disabling routing of a call in the event that an associated short code is not permitted to be used by the dialing stations; and
    performing subscriber-specific data-conversion operations at the dialled station, the operations being dependent on the short code produced by the dialling station and on the identity of the dialling station.

23. A method as in claim 22 wherein the comparison is performed at a location remote from the dialling station.

24. A method as in claim 22 further including:
    providing access to a private network, without additional password security, by comparing the identity of the dialling station with a stored database of permitted identities, and
    permitting the call to proceed only if the identity corresponds with one of the permitted identifies stored in the database.

25. A method as in claim 22 wherein the checking comprises comparing the short code dialled from said dailling station with a group of short dialling codes permitted to be used by the dialling station.

26. A method as in claim 22 including selectively routing calls corresponding to the short codes dialled by dialling stations to dialled stations.

27. A method as in claim 22 wherein a predetermined one of said short codes allows access from a first network to a second network.

28. A method as in claim 27, wherein the dialling station is a mobile station of a cellular radio network.

29. A method as in claim 28 wherein the mobile station transmits a unique stored identification code to the network to provide said identity.

30. A method as in claim 29 wherein the unique code is stored in a SIM card.

31. A method as in claim 28 wherein:

calling data received from a mobile station concerning the identity thereof and a short code, is referred to a service control means for determining whether the short code is permitted to be used by the mobile station, and the call is routed according to the short code if the short code is permitted for use, but otherwise failing the call.

32. A method as in claim 31 wherein a signal is transmitted to the mobile station to indicate that a call has failed when the short code in said calling data is determined to be impermissible for use by the mobile station.

33. A method as in claim 31 wherein a first network derives data concerning the permissible short codes for a roaming mobile station from the network from which it has roamed, in response to the roaming station registering with the first network.

34. A method as in claim 27 wherein a predetermined one of the short codes causes packet assembling and disassembling means to provide access to the second network from the first network.

35. A method as in claim 27 wherein the second network is a private network.

36. Method as in claim 22 wherein the short codes are two digit codes.

* * * * *